(12) United States Patent
Morris et al.

(10) Patent No.: US 12,533,639 B2
(45) Date of Patent: Jan. 27, 2026

(54) FILTER MEDIA

(71) Applicant: Dyson Technology Limited, Wiltshire (GB)

(72) Inventors: Gareth David Morte Morris, Bristol (GB); James George McManus, Nailsworth (GB); Benjamin James Hovell, Gloucester (GB)

(73) Assignee: Dyson Technology Limited, Wiltshire (GB)

( * ) Notice: Subject to any disclaimer, the term of this patent is extended or adjusted under 35 U.S.C. 154(b) by 701 days.

(21) Appl. No.: 16/759,218

(22) PCT Filed: Sep. 27, 2018

(86) PCT No.: PCT/GB2018/052756
§ 371 (c)(1),
(2) Date: Apr. 24, 2020

(87) PCT Pub. No.: WO2019/081882
PCT Pub. Date: May 2, 2019

(65) Prior Publication Data
US 2020/0316532 A1    Oct. 8, 2020

(30) Foreign Application Priority Data
Oct. 28, 2017   (GB) ...................................... 1717759

(51) Int. Cl.
*B01D 71/36*   (2006.01)
*B01D 39/16*   (2006.01)
(Continued)

(52) U.S. Cl.
CPC ......... *B01D 71/36* (2013.01); *B01D 39/1623* (2013.01); *B01D 39/1692* (2013.01);
(Continued)

(58) Field of Classification Search
CPC .... B01D 71/36; B01D 46/66; B01D 39/1623; B01D 39/1692; B01D 41/04;
(Continued)

(56) References Cited

U.S. PATENT DOCUMENTS

| | | |
|---|---|---|
| 2003/0010210 A1 | 1/2003 | Kawano et al. |
| 2016/0061158 A1 | 3/2016 | Taylor |
| 2016/0082376 A1 | 3/2016 | Choi |

FOREIGN PATENT DOCUMENTS

| | | |
|---|---|---|
| CN | 106268355 A | 1/2017 |
| DE | 102009057760 A1 | 6/2011 |

(Continued)

OTHER PUBLICATIONS

Notice of Reasons for Rejection dated Apr. 5, 2021, directed to JP Application No. 2020-523793; 6 pages.
(Continued)

*Primary Examiner* — Jennifer Dieterle
*Assistant Examiner* — Qianping He
(74) *Attorney, Agent, or Firm* — Tucker Ellis LLP

(57) ABSTRACT

A filter media includes a membrane and a protective scrim secured to a surface of the membrane. The membrane includes fibres of a first polymer having a diameter less than 1 micron, and the scrim includes fibres of a second polymer. The first polymer is hydrophobic and has a contact angle greater than 90 degrees, and the second polymer is hydrophilic and has a contact angle less than 90 degrees.

10 Claims, 2 Drawing Sheets

(51) Int. Cl.
*B01D 41/04* (2006.01)
*B01D 46/00* (2022.01)
*B01D 46/54* (2006.01)
*B01D 46/66* (2022.01)
*B01D 65/02* (2006.01)
*B01D 69/10* (2006.01)

(52) U.S. Cl.
CPC ........... *B01D 41/04* (2013.01); *B01D 46/543* (2013.01); *B01D 46/66* (2022.01); *B01D 65/02* (2013.01); *B01D 69/1071* (2022.08); *B01D 2239/0421* (2013.01); *B01D 2239/0428* (2013.01)

(58) Field of Classification Search
CPC .... B01D 46/543; B01D 65/543; B01D 65/02; B01D 69/10; B01D 2239/0421; B01D 2239/0428; B01D 39/16; B01D 46/54; B01D 46/00; B01D 2239/065; B01D 69/1071; B01D 39/2065
USPC ............................................................. 96/4
See application file for complete search history.

(56) References Cited

FOREIGN PATENT DOCUMENTS

| EP | 1180388 A1 | 2/2002 | |
|---|---|---|---|
| JP | 2002-126423 A | 5/2002 | |
| JP | 2002370020 A * | 12/2002 | ........... B01D 39/163 |
| JP | 2015-371 A | 1/2015 | |
| WO | 96/04063 A1 | 2/1996 | |

OTHER PUBLICATIONS

The First Office Action dated Mar. 31, 2021, directed to CN Application No. 201880065343.2; 14 pages.
Wetting of Fiber Aggregates (Part 1), 1971, Textile Engineering 24 (7): 43-49.
Office Action received for Korean Patent Application No. 10-2020-7011850, mailed on Apr. 26, 2022, 8 pages (4 pages of English Translation and 4 pages of Original Document).
International Search Report and Written Opinion dated Dec. 20, 2018, directed to International Application No. PCT/GB/2018/052756; 11 pages.
Search Report under Section 17 dated Mar. 19, 2018, directed to GB Application No. 1717759.3; 1 page.

* cited by examiner

FILTER MEDIA

CROSS-REFERENCE TO RELATED APPLICATIONS

This application is a national stage application under 35 USC 371 of International Application No. PCT/GB2018/052756, filed Sep. 27, 2018, which claims the priority of United Kingdom Application No. 1717759.3, filed Oct. 28, 2017, the entire contents of each of which are incorporated herein by reference.

FIELD OF THE DISCLOSURE

The present invention relates to a filter media suitable for removing solid matter from an air flow.

BACKGROUND OF THE DISCLOSURE

Filter media that incorporate a membrane of expanded polytetrafluoroethylene (ePTFE) are known. The membrane is relatively delicate and is easily damaged during transport and manipulation. Accordingly, a protective scrim is typically provided on one or both sides of the membrane.

An ePTFE membrane is comparatively expensive but is capable of achieving higher separation efficiencies than that of other media for the same pressure drop. The membrane is also relatively good at releasing dust upon washing. Nevertheless, any improvement in dust release will improve the efficacy of the filter media and is therefore desirable.

SUMMARY OF THE DISCLOSURE

According to various embodiments, the present invention provides a filter media comprising a membrane and a protective scrim secured to a surface of the membrane, wherein the membrane comprises fibres of a first polymer having a diameter less than 1 micron, the scrim comprises fibres of a second polymer, the first polymer has a contact angle greater than 90 degrees, and the second polymer has a contact angle less than 90 degrees.

The membrane is therefore formed of hydrophobic fibres, and the scrim is formed of hydrophilic fibres. By employing a membrane that comprises fibres less than 1 micron in diameter, a relatively high separation efficiency may be achieved for a relatively low pressure drop. Moreover, by employing hydrophobic fibres, relatively good dust release may be achieved upon washing.

Studies on conventional filter media have shown that, after washing, dust continues to be trapped on the exposed surface of the membrane. Moreover, the dust appears to be concentrated at those regions of the exposed surface that are adjacent the fibres of the scrim. According to various embodiments, the present invention is predicated on the realisation that the fibres of the scrim are formed of a hydrophobic polymer. The use of hydrophobic fibres seems sensible for a filter media that is intended to be washed. Indeed, it is the hydrophobic properties of the fibres of the membrane that are responsible for the effective dust release on washing. However, by employing hydrophobic fibres for the scrim, the relatively high contact angle inhibits water from penetrating those regions of the membrane that are adjacent the fibres of the scrim. According to various embodiments, the present invention is further predicated on the realisation that by employing a hydrophilic, rather than a hydrophobic, polymer for the scrim, water is better encouraged into those regions of the membrane upon washing and thus increased dust release may be achieved.

The first polymer may be polytetrafluoroethylene. This particular polymer has a relatively high contact angle and thus relatively good dust release may be achieved on washing. More particularly, the membrane may be formed of expanded polytetrafluoroethylene (ePTFE). ePTFE has the advantage that hydrophobic fibres having a diameter less than 1 micron may be mass produced using industrial processes that are relatively mature.

The scrim may have an areal weight of between 10 g/m2 and 50 g/m2. This then has the advantage that the scrim is able to provide adequate protection to the membrane without unduly restricting the flow of air through the filter media.

The term 'fibre' is used throughout this document and should be understood to include fibrils (such as those found in ePTFE) or other structural features having a diameter of less than 1 micron.

In order that the present invention may be more readily understood, an embodiment of the invention will now be described, by way of example, with reference to the accompanying drawings in which:

BRIEF DESCRIPTION OF THE FIGURES

FIGS. 4A and 4B illustrate two sectional views through the filter media of the present invention, the two views representing different stages in the washing of the filter media.

DETAILED DESCRIPTION OF THE DISCLOSURE

Figure 1:
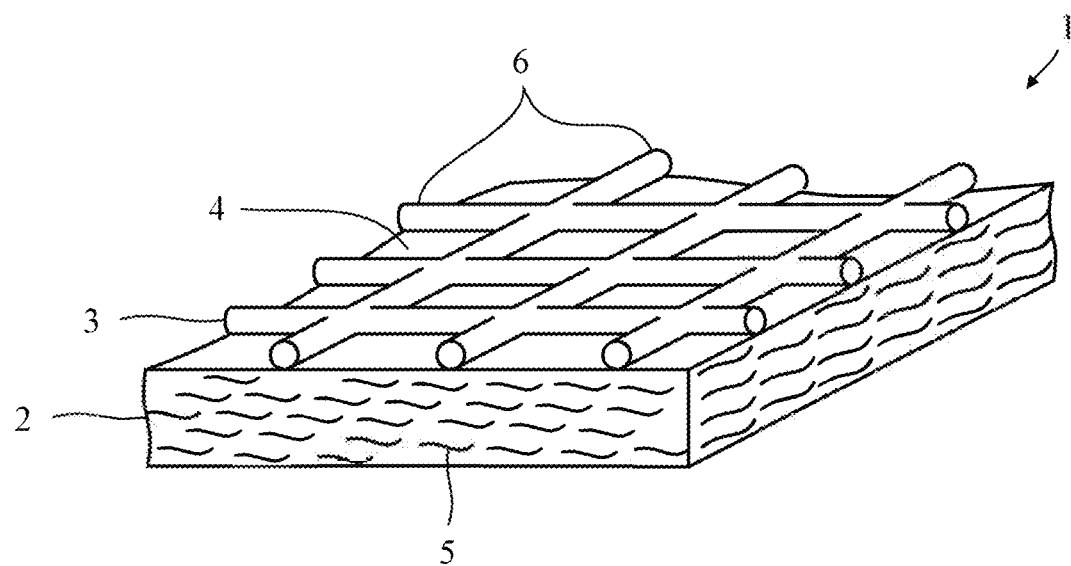
FIG. 1 is a perspective view of a filter media in accordance with the present invention.

The filter media 1 of FIG. 1 comprises a membrane 2 and a protective scrim 3 secured to a surface 4 of the membrane 2.

The membrane 2 is formed of fibres 5 of a first polymer having a diameter less than 1 micron. The first polymer is hydrophobic and has a contact angle greater than 90 degrees. Suitable candidates include, but are not limited to, polytetrafluoroethylene (PTFE) having a contact angle of about 110 degrees, polypropylene (PP) having a contact angle of about 102 degrees, and polyethylene (PE) having a contact angle of about 96 degrees. Expanded polytetrafluoroethylene (ePTFE) has particular advantages in that the polymer has a relatively high contact angle and fibres less than 1 micron in diameter may be mass produced using industrial processes that are relatively mature.

The scrim 3 comprises fibres 6 of a second polymer. The second polymer is hydrophilic and has a contact angle less than 90 degrees. Suitable candidates include, but are not limited to, polyethylene terephthala (PET) having a contact angle of about 72 degrees, nylon 6,6 or nylon 7,7 having a contact angle of about 70 degrees, polyethylene glycol (PEG) having a contact angle of about 63 degrees, and polyvinyl acetate (PVA) having a contact angle of about 61 degrees.

The fibres 6 form a non-woven having an areal weight of around 30 g/m2. Alternative areal weights are possible. For example, a lower areal weight may have the benefit of providing a larger open area and thus a smaller pressure drop. However, the protection afforded by the scrim 3 is likely to worsen. A higher areal weight may afford greater protection to the membrane 2. However, the scrim 3 is likely to present a greater restriction to the airflow moving the filter media 1, thus resulting in a higher pressure drop. An areal weight of between 10 g/m2 and 50 g/m2 provides a good balance between the competing factors of protection and pressure drop.

The scrim 3 is secured to the surface 4 of the membrane 2 by thermal bonding. Alternative methods may equally be used, e.g. adhesive or ultrasonic welding.

Figure 2:
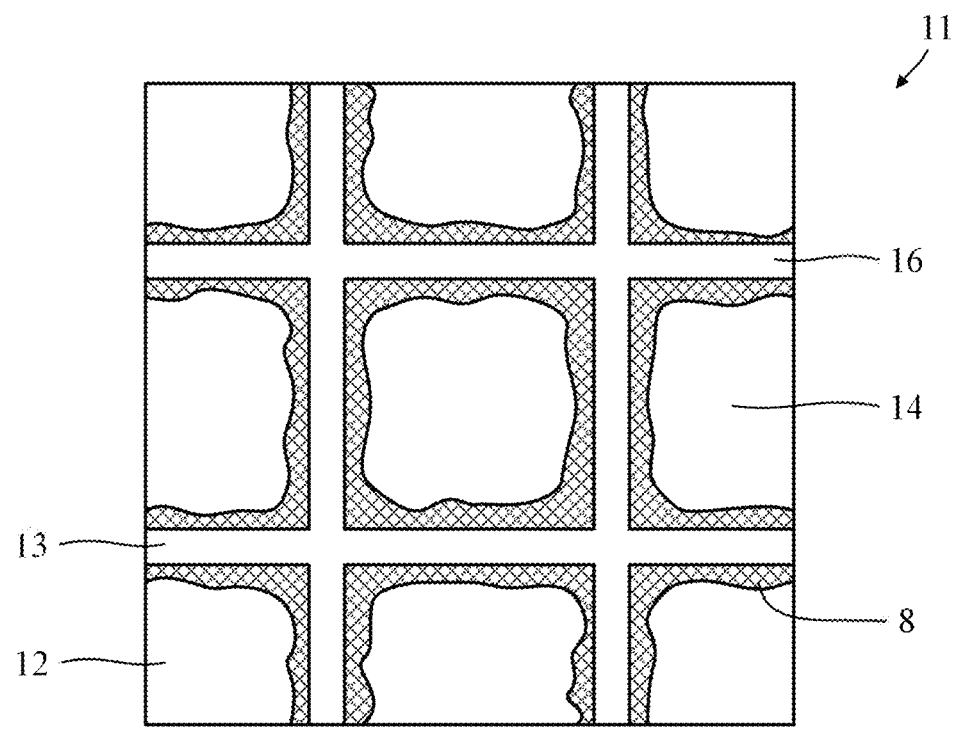
FIG. 2 is a plan view of a conventional filter media highlighting the dust that is present after washing.

The filter media 1 of the present invention arose out of studies on a conventional filter media 11 having a membrane 12 of ePTFE onto which a protective scrim 13 is bonded. One of the aims of the studies was to better understand and improve the release of dust from the filter media 11 on washing. As illustrated in FIG. 2, the fibres 16 of the scrim 13 may be regarded as dividing the exposed surface 14 of the membrane 12 into a number of cells. The studies observed that, after washing the conventional filter media 11, dust 8 continued to be present on the exposed surface 14 along the edges of each cell. It appeared that the fibres 16 of the scrim 13 were inhibiting full dust release. Possible solutions to this problem would be to remove the scrim 13 or use a scrim 13 having a lower areal weight and thus a larger open area. Whilst both solutions would increase the amount of dust that is released on washing, both solutions would render the membrane 12 less well protected. The present invention is predicated on the realisation that the fibres 16 of the scrim 13 were formed of a hydrophobic polymer, in this instance polyethylene. The use of a hydrophobic polymer seems sensible for a filter media that is intended to be washed. Indeed, it is the hydrophobic properties of the fibres 15 of the membrane 12 that are responsible for the effective dust release on washing. However, by employing a hydrophobic polymer for the scrim 13, the relatively high contact angle of the fibres 16 inhibits water from penetrating to the edges of the cells. The present invention is predicated on this identification and the realisation that by employing a hydrophilic, rather than a hydrophobic, polymer for the scrim, increased dust release may be achieved on washing.

Figure 3A:
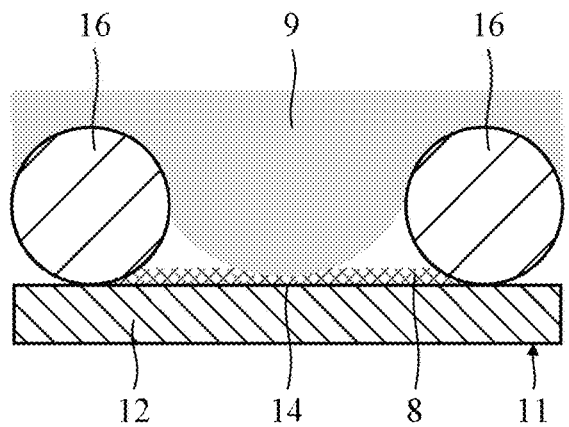
FIGS. 3A and 4B illustrate two sectional views through the conventional filter media, the two views representing different stages in the washing of the filter media.
Figure 3B:
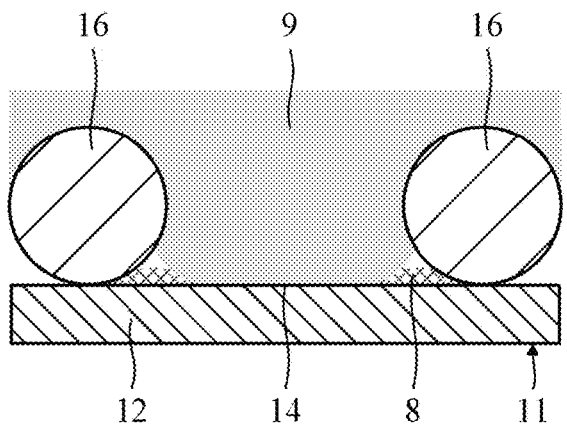
Figure 4A:
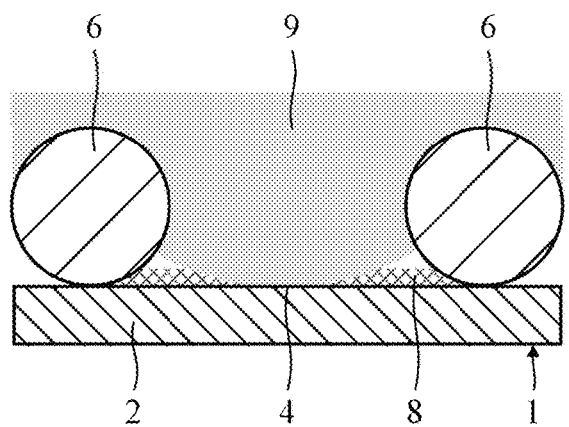
Figure 4B:
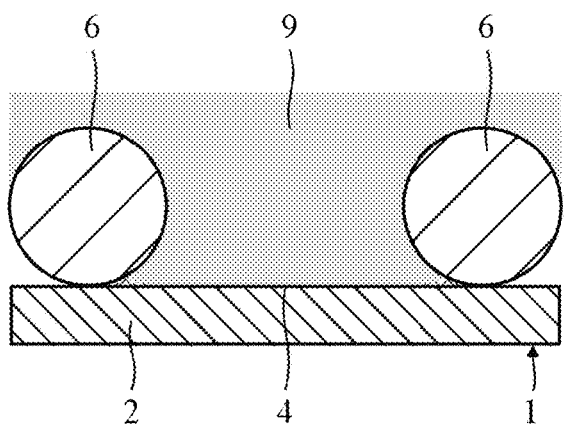

FIGS. 3A and 3B illustrate two stages in the washing of the conventional filter media 11, and FIGS. 4A and 4B illustrate the same stages in the washing of the filter media 1 of the present invention. With the conventional filter media 11, the hydrophobic fibres 16 of the scrim 13 do not wet readily. As a result, increased pressure or agitation is required in order to drive the water 9 down to the surface 14 of the membrane 12, as illustrated in FIG. 3A. Additionally, once the water 9 reaches the surface 14 of the membrane 12, the hydrophobic fibres 16 of the scrim 13 inhibit the water 9 from spreading outwards beneath the fibres 16, as illustrated in FIG. 3B. With the filter media 1 of the present invention, the hydrophilic fibres 6 of the scrim 3 draw water 9 further down into each of the cells. As a result, less pressure or agitation is required to drive the water 9 down to the surface 4 of the membrane 3, as illustrated in FIG. 4A. Additionally, once the water 9 reaches the surface 4 of the membrane 2, the hydrophilic fibres 6 of the scrim 3 better encourage the water 9 to spread outwards beneath the fibres 6, as illustrated in FIG. 4B. As a result, increased wetting of the membrane 2 is observed and thus more dust 8 is released for the same pressure or agitation.

The filter media 1 of the present invention therefore has the advantage that the efficacy of the filter media 1 after washing may be improved without compromising the protection afforded by the scrim 3 to the membrane 2.

In the embodiment described above, the fibres 6 of the scrim 3 are formed of a single hydrophilic polymer. It will be appreciated, however, that the above-described benefits would also be achieved by fibres 6 having a core of, for example, a hydrophobic polymer coated with a hydrophilic polymer. Accordingly, where reference is made in the claims to a scrim comprising fibres of a second polymer, this should be understood to mean that at least the outer surfaces of the fibres are formed of the second polymer.

The invention claimed is:

1. A filter media comprising:
a hydrophobic membrane, and
a hydrophilic protective scrim secured to an upstream facing surface of the hydrophobic membrane such that a portion of the surface of the hydrophobic membrane is exposed to dust through the hydrophilic protective scrim,
wherein the hydrophobic membrane comprises fibres of a first polymer having a diameter less than 1 micron, the hydrophilic protective scrim comprises fibres of a second polymer, the first polymer has a contact angle greater than 90 degrees, and the second polymer has a contact angle less than 90 degrees,
wherein each fibre of the hydrophilic protective scrim has an outer peripheral surface including first and second sections, wherein the first section contacts the upstream facing surface, wherein the second section extends continuously from a first end of the first section to a second end of the first section, and wherein the second section is exposed to an upstream environment.

2. The filter media of claim 1, wherein the first polymer is polytetrafluoroethylene.

3. The filter media of claim 1, wherein the hydrophilic protective scrim has an areal weight of between 10 g/m$^2$ and 50 g/m$^2$.

4. The filter media of claim 2, wherein the hydrophilic protective scrim has an areal weight of between 10 g/m$^2$ and 50 g/m$^2$.

5. The filter media of claim 1, wherein the second polymer is selected from the group consisting of polyethylene terephthalate, nylon 6,6, nylon 7,7, polyethylene glycol, and polyvinyl acetate.

6. The filter media of claim 1, wherein the filter media further comprises a second hydrophilic protective scrim secured to a downstream surface of the hydrophobic membrane such that the hydrophobic membrane is positioned between the hydrophilic protective scrim and the second hydrophilic protective scrim.

7. The filter media of claim 6, wherein the second hydrophilic protective scrim defines a downstream extent of the filter media.

8. The filter media of claim 1, wherein the fibres of the hydrophilic protective scrim divide the upstream facing surface of the hydrophobic membrane into a number of cells.

9. A filter media comprising:
a hydrophobic membrane,
a first hydrophilic protective scrim secured to an upstream facing surface of the hydrophobic membrane such that a portion of the surface of the hydrophobic membrane is exposed to dust through the first hydrophilic protective scrim, and
a second hydrophilic protective scrim secured to a downstream facing surface of the hydrophobic membrane,
wherein the hydrophobic membrane comprises fibres of a first polymer having a diameter less than 1 micron, the first and second hydrophilic scrims comprise fibres of a second polymer, the first polymer has a contact angle greater than 90 degrees, and the second polymer has a contact angle less than 90 degrees, wherein each fibre of the first hydrophilic protective scrim has an outer peripheral surface including first and second sections in cross-section, wherein an entirety of the first section contacts the upstream facing surface, wherein the second section of the outer peripheral surface extends continuously from a first end of the first section to a second end of the first section, and wherein the second section is fully exposed to an ambient environment.

10. The filter media of claim 9, wherein the fibres of the first hydrophilic protective scrim divide the upstream facing surface of the hydrophobic membrane into a number of cells.

* * * * *